J. KUČERA.
HARROW ATTACHMENT FOR CULTIVATORS.
APPLICATION FILED OCT. 15, 1915.

1,199,575.

Patented Sept. 26, 1916.

INVENTOR.
John Kučera
By Frank Schraeder Jr
Attorney

UNITED STATES PATENT OFFICE.

JOHN KUČERA, OF EAST BERNARD, TEXAS.

HARROW ATTACHMENT FOR CULTIVATORS.

1,199,575.      Specification of Letters Patent.      Patented Sept. 26, 1916.

Application filed October 15, 1915. Serial No. 55,968.

*To all whom it may concern:*

Be it known that I, JOHN KUČERA, a subject of the Emperor of Austria-Hungary, residing at East Bernard, in the county of Wharton and State of Texas, have invented a certain new and useful Improvement in Harrow Attachments for Cultivators, of which the following is a specification.

This invention relates to a harrow attachment for cultivators, one of its objects being to provide a harrow attachment having standards adjustably connected thereto and adapted to be substituted for the usual standards and foot pieces of the cultivator shovels, the connections between the harrow member and the cultivator being such as to permit the attachment to be held with its teeth disposed at an angle to the cultivator.

Another object of my invention is the provision of a new and useful harrow tooth which has a bent, flattened, and pointed end and which will not only break the soil, but will also cause a continuous turning of the soil as it moves through same.

Figure 1:
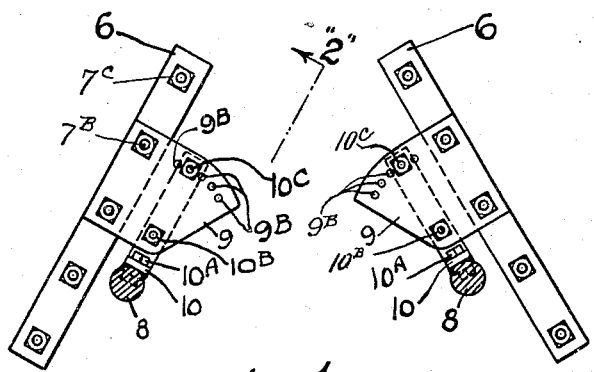
Figure 2:
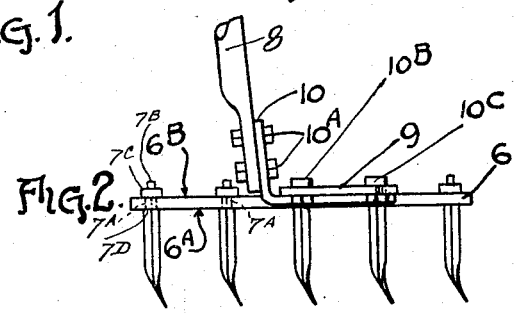
Figures 3, 5:
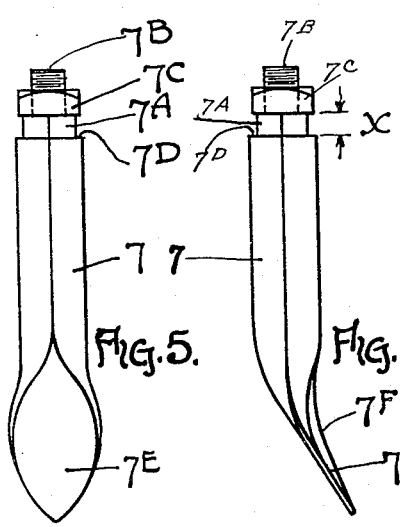
Figure 4:
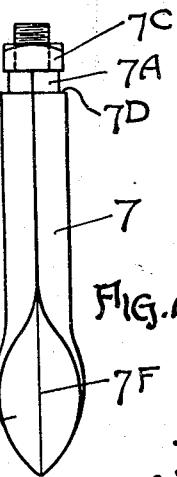

In the accompanying drawings forming a part of this application Figure 1 is a plan view of my invention. Fig. 2 is an elevation taken on line 2—2 of Fig. 1. Figs. 3, 4 and 5 illustrate, respectively, enlarged details of the side, front and rear views of my improved harrow tooth.

Referring to the drawings, the implement or attachment constituting the present invention is constructed and designed to be substituted for a cultivator shovel and its standard, and includes a bar 6 having a number of square openings adapted to receive the square ends $7^A$ of the tooth 7. These square ends $7^A$ are of decreased section to form a shoulder $7^D$ and thereby afford the body of the tooth 7 a stable ridge support against the under face $6^A$ of the bar 6 when the nut $7^C$ is screwed and tightened over the threaded portion $7^B$ against the top face $6^B$ of the bar 6; the height X of the portion $7^A$ being less than the thickness of the bar 6.

The lower portion $7^E$ of the tooth 7, illustrated by Figs. 3, 4 and 5 is bent at an angle to the main body and diagonally to the square cross section thereof, (clearly shown by Fig. 3), and is flattened and pointed. A slight ridge $7^F$ may be formed on the center of the front face, (although not necessary), to allow for more metal in the center of the blade $7^E$ for strength. This form or shape of tooth is more efficient when compared with the ordinary straight and pointed one, due to the deflecting action which not only breaks the soil but also deflects and turns it.

Adjustable means are provided for the connection between the bar 6 and the standard 8. A rigid plate 9 is secured to the bar 6 with the nuts $7^C$. The bent bar 10 is secured with bolts $10^A$ to the standard 8 and connects with a pair of bolts $10^B$ and $10^C$. A plurality of holes $9^B$ are provided and arranged on an arc of a circle whose center is the bolt $10^B$. It is obvious then that the bar 10 can be moved about the bolt $10^B$ as a pivot and the bolt $10^C$ moved into any one of said holes $9^B$ to secure the bar 6 and the harrow teeth at a variety of angles or positions relative to the cultivator standards 8.

I claim:

1. A ground-treating implement, including a tooth carrying bar, a plate rigidly secured to said bar and in the plane thereof, said plate having a plurality of openings arranged on an arc whose center is within another independent opening, a standard, a bent connection-bar rigidly connected to said standard, said connection-bar having a pivotal connection with said plate about said other independent opening and arranged for rigid connection with any one of said plurality of openings.

2. A ground-treating implement, including a plurality of tooth-carrying bars arranged angularly to their line of movement and to each other, standards supporting said bars, and a plate rigidly secured to each bar and in the plane thereof, said plate having a plurality of openings arranged on an arc, whose center is within another independent opening, a bent-connection bar rigidly connected to each standard, said connection-bar having a pivotal connection with said plate by said other independent opening and arranged for rigid connection with any one of said plurality of openings.

In witness whereof, I have hereunto subscribed my name this 9 day of October, 1915.

JOHN KUČERA.

Copies of this patent may be obtained for five cents each, by addressing the "Commissioner of Patents, Washington, D. C."